United States Patent [19]
Biever

[11] 3,727,651
[45] Apr. 17, 1973

[54] PORTABLE HIGH VOLUME GAS SUPPLY SYSTEM

[76] Inventor: Robert E. Biever, 3247 East Charlinda, West Covina, Calif. 91791

[22] Filed: Mar. 17, 1971

[21] Appl. No.: 125,250

[52] U.S. Cl. ..................141/231, 62/52, 141/82, 141/38, 152/415
[51] Int. Cl. ..................B65b 3/04
[58] Field of Search..................141/82, 231, 1, 4, 141/11, 37, 38, 313; 152/415; 62/50, 51, 52, 53

[56] References Cited

UNITED STATES PATENTS

| | | | |
|---|---|---|---|
| 2,907,176 | 10/1959 | Tsunoda et al. | 62/52 |
| 2,945,354 | 7/1960 | Moskowitz | 62/52 |
| 3,124,940 | 3/1964 | Guelton | 62/52 |
| 3,077,745 | 2/1963 | Grantham et al. | 62/52 |
| 802,905 | 10/1905 | Bobrick | 62/52 |

FOREIGN PATENTS OR APPLICATIONS

| | | | |
|---|---|---|---|
| 812,002 | 4/1959 | Great Britain | 62/52 |

Primary Examiner—Houston S. Bell, Jr.
Attorney—Christie, Parker & Hale

[57] ABSTRACT

There is provided a mobile system for dispensing a gas generated as a consequence of vaporization of a cryogenic fluid at high volumetric flow rates and at temperatures approaching ambient. The system consists of a cart-mounted container for a cryogenic fluid and a gas dispensing system having, as a part thereof, a contained and protected primary heat transfer coil secured to a secondary heat transfer surface which is a part of the cart.

10 Claims, 4 Drawing Figures

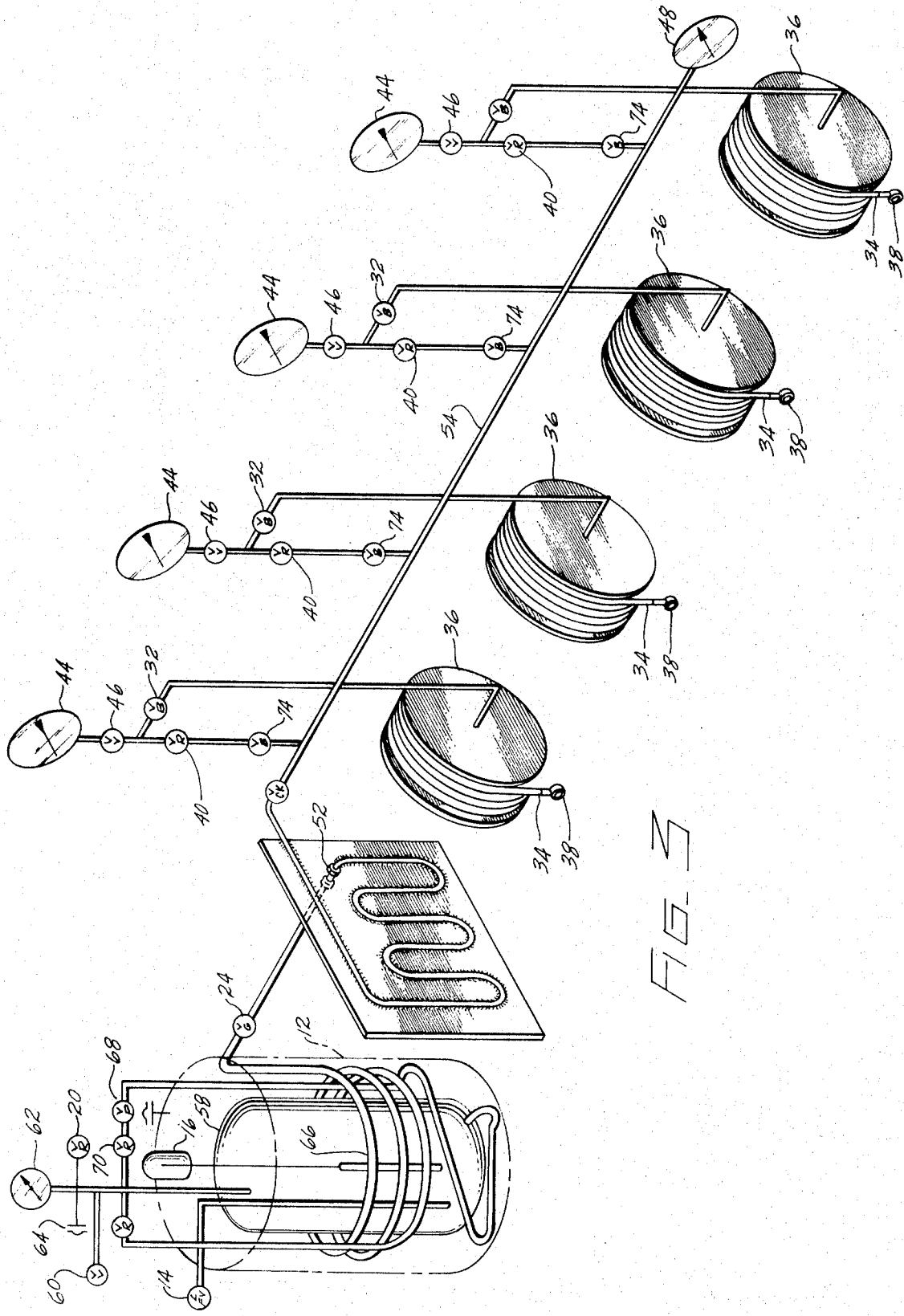

PORTABLE HIGH VOLUME GAS SUPPLY SYSTEM

BACKGROUND OF THE INVENTION

Many field applications have established a need for a portable supply of gas capable of dispensing gas at high volumetric flow rates.

The FAA, for instance, requires that aircraft tires prior to being mounted on landing gear be pressurized to no more than about 30 psig. Service pressures, however, are often in excess of 200 psig. Thus, a rim-mounted tire is attached to the landing gear and then pressurized to its working level. As will be appreciated, the volume of gas required to achieve operational pressure is substantial.

Another example are the jumbo jets which lose tire pressure equivalent to about 4 to 5 psig as a consequence of the forces created during landing operations. The tires must be rapidly serviced after each landing and again the total volume of gas required may be substantial.

The tires on heavy road construction equipment also suffer a loss of tire pressure during use and present yet another example of a system requiring a portable supply of a pressurizing gas.

For many applications, it is important to supply the gas at temperatures approaching ambient. This has been feasible at low gas flow rates but, as yet, no system has been proposed to provide high volumetric flow rates without attendant cooling of the gas stream, or in the case of gas generated as a consequence of vaporization of the cryogenic fluid, an ability of heat the gas stream to required delivery temperatures.

SUMMARY OF THE INVENTION

According to the present invention, there is provided a mobile system capable of delivering a contained supply of gas generated as a consequence of vaporization of a cryogenic fluid at high volumetric flow rates and at elevated pressures under a variety of ambient conditions.

The system, in general, comprises a mobile cart containing means for providing a supply of gas generated as a consequence of evaporation of a cryogenic fluid and means for dispensing the generated gas, the dispensing means including as an integral part thereof, a primary heat transfer coil secured to some protecting heat conductive portion of the cart in heat transfer relation. Using that portion of the cart to which the primary heat transfer coil is secured as a secondary source of heat for the gas, the generated gas supply may be dispensed at, or close to, ambient temperature at high volumetric flow rates.

In the preferred construction, the coil is secured to an internal portion of a cart-mounted control housing and is manifolded to a plurality of reel-mounted hoses having gas supply valves adapted to couple to suitable filling valves on a system to which gas is to be dispensed. In providing a plurality of hoses manifolded to the gas source through the primary heat transfer coil, many receptacles, such as tires, can be serviced without repositioning of the cart.

DRAWINGS

FIG. 3 is a schematic illustration of the preferred network for providing a high volume supply of gas based on a cryogenic source.

DESCRIPTION

According to the present invention, there is provided a mobile gas supply system which provides a source of gas generated as a consequence of volatilization of a cryogenic fluid which may be dispensed at high volumetric flow rates under a variety of ambient conditions.

The system comprises, in general, a mobile cart having mounted thereon, or means adapted to receive, a cryogenic fluid container having an internal or contained means to vaporize the fluid and a system for dispensing gas generated as a consequence of vaporization of the fluid, the system including as an integral part, thereof, a primary heat transfer coil secured to some conductive portion of the cart in heat transfer relation. That portion of the cart to which the primary heat transfer coil is secured serves as a secondary source of heat for gas passing through the primary heat transfer coil.

As the gas dispensing system of this invention finds particular utility for field servicing of aircraft tires and the like, it will be described in terms of that utility.

Figure 1:
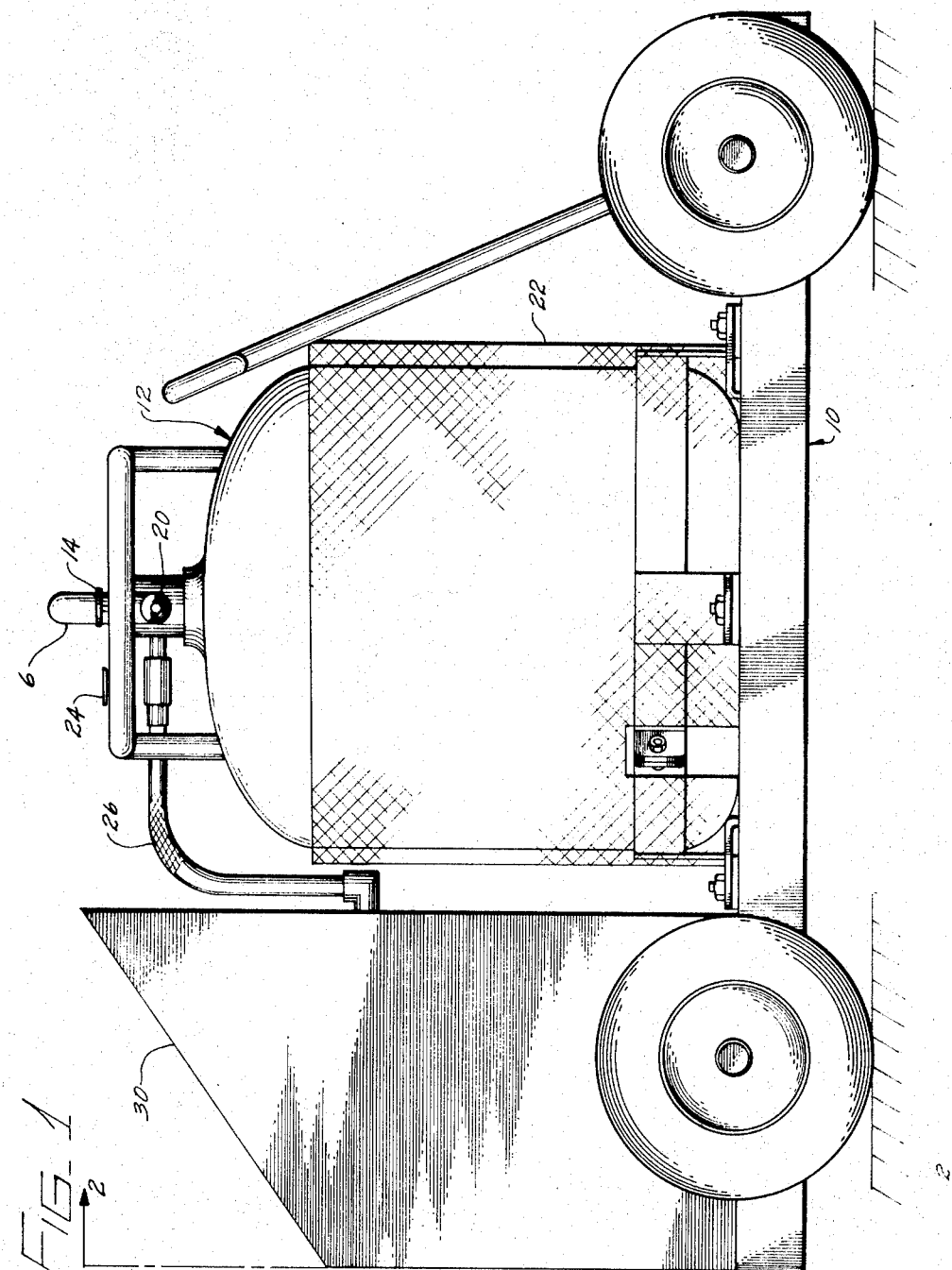
FIG. 1 is a side view of the mobile high volume gas supply system of this invention.
Figure 2:
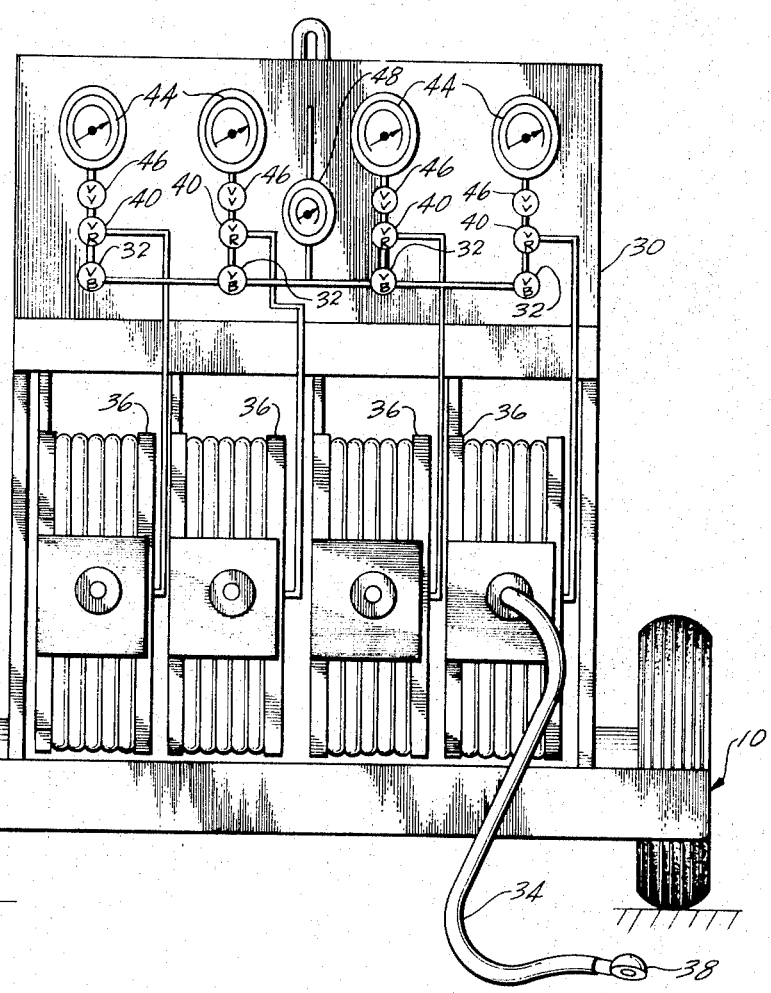
FIG. 2 is the frontal view of the mobile gas supply system shown in FIG. 1.

With reference first to FIGS. 1 and 2, there is provided cart 10, which may be wheel or skid mounted, container 12 for a low-boiling cryogenic fluid such as liquid nitrogen. The container is, in general, fitted with fill valve coupling 14 for the liquefied fluid, liquid level gauge 16, and a suitable relief valve 20. For maximum safety, container 12 is provided with a surrounding shield 22 which may be solid, perforated, expanded metal or the like.

Container 12, as will be more particularly pointed out, has an internal system for vaporizing a contained cryogenic fluid and a valve 24 for dispensing the gas generated as a consequence of vaporization of the cryogenic fluid. The gas passes through flexible hose 26, which may also be shielded, and to some gas distribution system contained within cart-mounted housing 30, the detail of which will be described with reference to FIG. 3 and FIG. 4.

In addition to containing a distribution system for the gas generated, there is also mounted on one exposed face of housing 30 suitable means for controlling and monitoring the delivery of the gas.

In the system shown, the gas is dispensed by opening ball valves 32 feeding a plurality of pressure hoses 34 which are retractably contained by spring or coil biased reels 36. At the end of each hose there is provided a suitable dispensing valve 38 adapted to couple with the inlet valve of the gas receiving system. In the case of the servicing of aircraft, this may be a tire valve. It may, in addition, be a valve servicing hydraulic system, a blow line or the like.

The pressure of the gas supplied to hoses 34 is regulated by high volume, low pressure regulators 40, ahead of valves 32 with the delivery pressure being registered on gauges 44. There is also provided vent valves 46 for venting the system during over-pressure or exhausting conditions. The delivery pressure to the manifold feeding valves 32 is also registered on panel-mounted gauge 48.

With reference now to FIG. 3, there is shown the schematic for the preferred mobile gas distribution system service cart of this invention. With reference thereto, gas generated as a consequence of vaporization of a cryogenic fluid in container 12 passes through valve 24 at an initially regulated build-up pressure to the distribution system contained within cart-mounted housing 30 depicted in FIGS. 1 and 2.

Since the gas is generated as a consequence of vaporization of a cryogenic fluid, it will leave the vaporization system at temperatures far below ambient. If it were then dispensed to, for instance, a tire at or about that temperature there would be a large increase in tire pressure once the gas warmed to ambient temperatures. In addition, a tire could be damaged by exposure to gas at extremely low temperatures.

Figure 4:
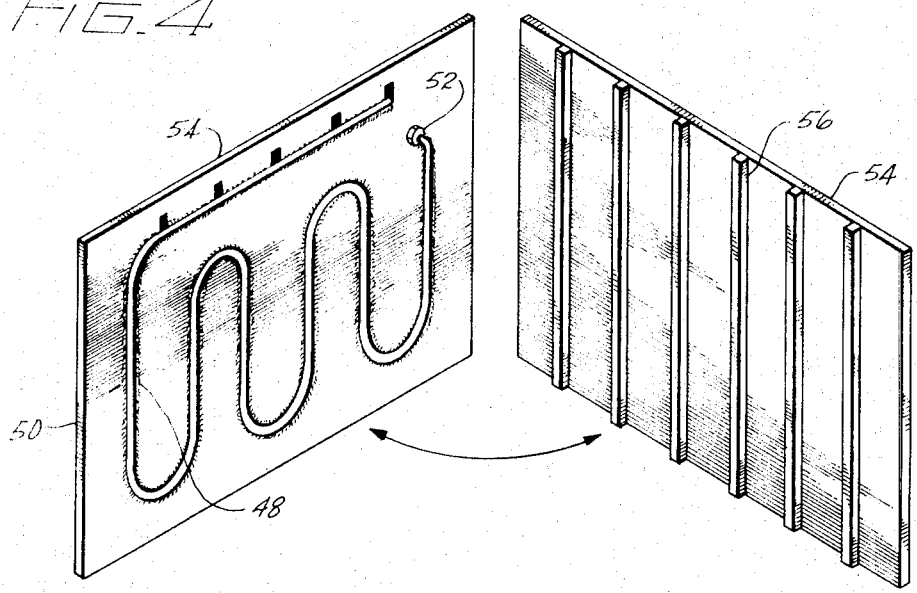
FIG. 4 is an illustration of an alternate heat source system for use in the gas supply system of this invention.

With reference now to FIGS. 3 and 4, there is secured to at least one inner panel surface 48 of housing 30 a primary heat exchange coil 50 in heat exchange relation. THis is to assure the gas will be dispensed at or close to ambient temperatures. The primary heat exchange coil is coupled to one end 52 to hose 26 and at the opposed end to manifold 54 which services the several hoses 34 on reels 36 contained in housing 30.

The primary heat transfer coil 50 is preferably made of high strength metals of high conductivity, such as aluminum, copper, stainless steel and the like, and is secured to panel 48 by brazing, soldering, welding or similar means so there will be established a high level of conductive heat exchange relation between panel 48 and coil 50. Panel 48 serves as secondary source of heat for a gas stream passing through coil 50 and permits the gas to be dispensed at high volumetric flow rates at temperatures approaching ambient.

The heat transfer system consisting of the coil 50 and panel 48, as well as the body of housing 30 provide heat transfer to the gas as a consequence of conduction. Housing 30 may, moreover, be open at the top and base to provide for flow of air through the housing to provide additional heat transfer to the coil by means of convection.

For most severe temperature requirements, it may be desired to sandwich coil 50 between two conductive surfaces in a manner which provides additional heat by both conduction and convection. This is illustrated in FIG. 4.

Plate 54 having projecting ribs 56 which mate with the vertical risers of coil 50 is also secured to the coil. The ribs provide openings at the top and base of the sandwich construction. In addition to heat transfer through plate 54, and ribs 56, there is additional heat transfer by convection as a consequence of the flow of ambient air downward through the sandwich as provided by suitable openings in housing 30.

In a construction, an aluminum heat transfer tubing having outside diameter of 0.75 inch and a wall thickness of 0.028 inch, is secured to an aluminum panel having a surface area of about 10 square feet. With this construction it is possible to deliver, from a convectional liquid nitrogen cryogenic vaporization system, up to 2,000 cubic feet of nitrogen per hour measured at standard conditions to a plurality of reel-mounted hoses at regulated pressures of from about 20 to about 200 psig at temperatures within about 20°F of ambient.

The operation of the gas distribution system of this invention may be more fully described with reference to FIG. 3.

Cryogenic vessel 12 contains an inner flask, such as a Dewar flask 58 which is filled, as required, through liquid valve 14 having a coupling adapted to receive a cryogenic fluid, such as nitrogen, from a suitable storage tank. Flask 58 is further fitted with liquid level gauge 16, pressure gauge 62, release valve 20 and burst disc 64 for safety purposes.

Liquid exits the base of container 58 and vaporizes in surrounding coil 66. As this occurs, service pressure builds up, the pressure being controlled by pressure building valve 68 and regulator 70.

By the time the discharge from container 58 reaches valve 24, complete vaporization has occurred and the discharge is a vaporized cryogenic fluid in the gaseous state. The gas passing through valve 24 is transmitted by flexible line 26 through primary heat exchange coil 50 where it receives heat from the body of at least coil 50 and the body of plate 48 and where desired, by convection.

In this process, the temperature of the vaporized cryogenic fluid is raised to that approaching ambient. The gas is then passed through check valve 72 which prevents a reverse flow of gas to manifold 54. The manifold 54 distributes the gas supply to ball valves 74 which when opened provide a flow of gas to or through high volume flow regulators 40, ball valves 32 and vent valves 46. When ball valves 32 are opened the gas is distributed through lines 76 to hoses 34 mounted on reels 36 and to suitable couplings 38. Each line is provided with pressure gauge 44 and the pressure in manifold 54 is separately registered on gauge 48. This provides a continuous monitoring of gas pressures available which also indicates the supply of cryogenic liquid contained in flask 58.

In order to maximize the flow rates through this distribution system, the tubing, valves and regulators are selected to minimize restrictions in the path of flow so that there will not be present orifices, or the like, which limit gas flow which, in turn, causes cooling of the gas during flow conditions.

While the gas distribution system of this invention has been described primarily in terms of dividing a source of nitrogen, the system is adapted for dispensing any vaporizable cryogenic liquid such as, for instance, liquid argon, liquid oxygen and the like, with the sizing of the cryogenic container and fittings modified to meet the requirements for the cryogenic liquid to be dispensed.

What is claimed is:

1. A mobile system for providing a self-contained supply of gas at high volumetric flow rates and elevated pressures which comprises a mobile cart containing:

a. means for producing a supply of gas at an elevated pressure and at a temperature below ambient; said supply of gas generated by vaporization of a cryogenic fluid;

b. a gas heating system in communicating connection with the gas producing means, said system including a primary heat transfer coil secured in heat transfer relation to a secondary heat transfer surface, said secondary heat transfer surface enclosing at least part of said primary heat transfer coil; and c. a gas distribution system in connecting communication with the outlet of said gas heating system, said gas distribution system adapted to be connected to a pressurized gas receiving vessel.

2. A mobile gas supply system as claimed in claim 1 in which the cryogenic fluid is liquid nitrogen.

3. A mobile gas supply system as claimed in claim 1 in which said gas heating system is contained within a control housing mounted on said cart, the primary heat transfer coil of said gas heating system secured to at least one inner surface of said housing.

4. A mobile gas supply system as claimed in claim 3 of which said housing is open at the upper and lower ends thereof to permit a convective flow of ambient air through said housing.

5. A mobile gas supply system as claimed in claim 4 in which the primary heat transfer coil is further secured to a second ribbed heat conductive surface parallel to the inner surface of the housing to which the primary heat transfer coil is secured, the ribs of said second heat transfer surface being parallel and secured to the surface of the primary heat transfer coil opposed to the inner surface of said housing to which the primary heat transfer coil is secured to provide conductive and convective heat transfer to said primary heat transfer coil.

6. A mobile gas supply system as claimed in claim 1 in which the gas distribution system comprises a plurality of spring biased reel mounted pressure hoses manifolded in connecting communication to the outlet of said primary heat transfer coil, the housing adapted to couple to a pressurizable receptacle.

7. A mobile system for providing a self-contained supply of gas at high volumetric flow rates and elevated pressures which comprises a mobile cart containing:

a. means for producing a supply of gas at an elevated pressure and at a temperature below ambient, said supply of gas generated by vaporization of a cryogenic fluid;

b. a primary heat transfer coil in connecting communication to the outlet of said means for producing a supply of gas, said primary heat transfer coil secured in heat transfer relation to at least one inner surface of a cart mounted housing;

c. a gas distribution system comprising a manifold in connecting communication with the outlet of the primary heat transfer coil, the outlet of said manifold, in turn, being in connecting communication with a plurality of spring biased reel mounted hoses adapted to couple to pressurizable receptacle.

8. A mobile gas supply system as claimed in claim 7 in which the cryogenic fluid is liquid nitrogen.

9. A mobile gas supply system as claimed in claim 8 in which said housing is open at the upper and lower end s thereof to permit a flow of ambient air through said housing.

10. A mobile gas supply system as claimed in claim 9 in which the primary heat transfer coil is further secured to a second ribbed heat conductive surface parallel to the inner surface of the housing to which the primary heat transfer coil is secured, the ribs of said second heat transfer surface being parallel and secured to the wall of said primary heat transfer coil opposed to the inner surface of said housing.

* * * * *